(12) United States Patent
Wu et al.

(10) Patent No.: US 8,909,242 B2
(45) Date of Patent: Dec. 9, 2014

(54) COOPERATIVE SPECTRUM SENSING METHOD AND SYSTEM FOR LOCATIONING PRIMARY TRANSMITTERS IN A COGNITIVE RADIO SYSTEM

(75) Inventors: Sau-Hsuan Wu, New Taipei (TW); Din-Hwa Huang, Taipei (TW); Chun-Hsien Ko, Taipei (TW)

(73) Assignee: National Chiao Tung University, Hsinchu (TW)

( * ) Notice: Subject to any disclaimer, the term of this patent is extended or adjusted under 35 U.S.C. 154(b) by 489 days.

(21) Appl. No.: 13/311,071

(22) Filed: Dec. 5, 2011

(65) Prior Publication Data

US 2012/0309444 A1  Dec. 6, 2012

(30) Foreign Application Priority Data

Jun. 2, 2011  (TW) .............................. 100119421 A

(51) Int. Cl.
*H04W 16/14*  (2009.01)

(52) U.S. Cl.
CPC .................................. *H04W 16/14* (2013.01)
USPC ........ 455/454; 455/448; 455/446; 455/67.11; 455/450

(58) Field of Classification Search
None
See application file for complete search history.

(56) References Cited

U.S. PATENT DOCUMENTS 7,610,036 B2  10/2009  Teo et al.
7,768,252 B2  8/2010  Park et al.
2006/0029279 A1  2/2006  Donoho
2010/0069013 A1*  3/2010  Chaudhri et al. .......... 455/67.11
2010/0135214 A1  6/2010  Ishizu et al.

OTHER PUBLICATIONS

Cooperative Spectrum Sensing in TV White Spaces When Cognitive Radio Meets Cloud, Apr. 2011.
Cooperative Spectrum Sensing and Locationing a Sparse Bayesian Learning Approach, Dec. 2010.
Chun-Hsien Ko, Din Hwa Huang and Sau-Hsuan Wu, Cooperative Spectrum Sensing in TV White Spaces: When Cognitive Radio Meets Cloud, IEEE INFOCOM 2011 Workshop on Cloud Computing, 683-688, Apr. 2011.
Chun-Hsien Ko, Din Hwa Huang and Sau-Hsuan Wu, Cooperative Spectrum Sensing in TV White Spaces: When Cognitive Radio Meets Cloud, Apr. 2011.
D.H. Tina Huang, Sau-Hsuan Wu and Peng-Hua Wang, Cooperative Spectrum Sensing and Locationing: A Sparse Bayesian Learning Approach, Dec. 2010.
Juan-Andres Bazerque and Georgios B. Giannakis, Distributed Spectrum Sensing for Cognitive Radio Networks by Exploiting Sparsity, IEEE, 2009, Nov. 2009.
Shihao Ji, Ya Xue, and Lawrence Carin, Bayesian Compressive Sensing, pp. 1-23, Oct. 2007.

* cited by examiner

*Primary Examiner* — Philip Sobutka
(74) *Attorney, Agent, or Firm* — SmithAmundsen LLC; Dennis S. Schell; Kelly J. Smith

(57) ABSTRACT

In a cooperative spectrum sensing method and system for locationing primary transmitters, each of secondary users transmits to a corresponding one of cognitive radio (CR) base station location information thereof and a received signal strength indicator (RSSI) value generated thereby in response to sensing power signals from the primary transmitters. The CR base stations transmit the location information and the RDDI values of the secondary users to a data fusion center such that the data fusion center obtains the number and locations of the primary transmitters based on the location information and the RSSI values received thereby using a learning algorithm to thereby reconstruct a power propagation map of the primary transmitters.

12 Claims, 5 Drawing Sheets

POWER PROPAGATION MAP RECONSTRUCTED BY THE PREFERRED EMBODIMENT

COOPERATIVE SPECTRUM SENSING METHOD AND SYSTEM FOR LOCATIONING PRIMARY TRANSMITTERS IN A COGNITIVE RADIO SYSTEM

CROSS-REFERENCE TO RELATED APPLICATION

This application claims priority to Taiwanese Application No. 100119421, filed on Jun. 2, 2011.

BACKGROUND OF THE INVENTION

1. Field of the Invention

The invention relates to wireless communications, and more particularly to a cooperative spectrum sensing method and system for locationing primary transmitters in a cognitive radio system.

2. Description of the Related Art

Cognitive radio (CR) aims at improving the spectrum utilization in wireless communications. In a CR system, secondary users, such as customer premise equipments (CPEs), are permitted to utilize vacant spectra in frequency, time and space without causing interference with primary users.

To establish geo-location information of primary users in a CR system, each CPE is required to incorporate a positioning unit, such as a global positioning system (GPS) positioning device, for obtaining GPS information thereof. However, CPEs are likely to be sparsely and randomly distributed in space. In this case, base stations (BSs) of the CR system may use compressive sensing to obtain spectrum sensing signal strengths and locations of the CPEs, thereby reconstructing a power propagation map of the primary users as proposed in an article by E. Candes, J, Romberg, and T. Tao, entitled "Robust Uncertainty Principles: Exact Signal Reconstruction from Highly Incomplete Frequency Information," IEEE Trans. on Information Theory, No. 2, vol. 52, pp. 489-506, February 2006. Although compressive sensing allows perfect signal reconstruction at a random sampling rate lower than that defined by Nyquist theorem, compressive sensing fails to obtain the number of the primary users when directly applied to spectrum sensing and locationing of the primary users.

Furthermore, a CR system with sparse samples, which has been proposed in an article by Juan Andres Bazerque and Feorgios B. Giannakis, entitled "Distributed Spectrum Sensing for Cognitive Radio Networks by Exploiting Sparsity," IEEE Trans, on Signal Processing, vol. 58, no. 3, pp. 1847-1862, March 2010, is directed to estimate the locations and power propagation map of primary users. However, since basis weights are estimated, such a CR system cannot ensure accurate location estimation. If the accuracy of location estimation is improved, the amount and complexity of computation will increase, thereby adversely affecting processing speed and protection for the primary users.

Therefore, improvements may be made to the above techniques.

SUMMARY OF THE INVENTION

Therefore, an object of the present invention is to provide a cooperative spectrum sensing method and system for locationing primary transmitters in a cognitive radio system that can overcome the aforesaid drawbacks of the prior art.

According to one aspect of the present invention, there is provided a cooperative spectrum sensing method of locationing primary transmitters in a cognitive radio (CR) system. Each of the primary transmitters transmits a power signal. The CR system includes a number (N) of secondary users, which are randomly located in a predetermined area and are divided into a plurality of sets, and a plurality of CR base stations disposed in the predetermined area and corresponding respectively the sets of the secondary users. The cooperative spectrum sensing method comprising the steps of:

a) configuring each of the secondary users to obtain location information thereof, generate a received signal strength indicator (RSSI) value in response to sensing the power signals from the primary transmitters, and transmit the location information and the RSSI value such that each of the CR base stations receives and collects the location information and the RSSI values from a corresponding set of the secondary users;

b) configuring each of the CR base stations to transmit the location information and the RSSI values collected thereby to a data fusion center through a backbone network such that the data fusion center receives the location information and the RSSI values associated with all the secondary users; and c) configuring the data fusion center to obtain the number and locations of the primary transmitters in the predetermined area based on the location information and the RSSI values received thereby using a learning algorithm to thereby reconstruct a power propagation map of the primary transmitters in the predetermined area.

According to another aspect of the present invention, there is provided a cooperative spectrum sensing system for locationing primary transmitters in a predetermined area. Each of the primary transmitters transmits a power signal. The cooperative spectrum sensing system comprises:

a number (N) of secondary users randomly located in the predetermined area and divided into a plurality of sets, each of the secondary users including a positioning module for obtaining location information thereof, being adapted for sensing the power signals from the primary transmitters to generate a received signal strength indicator (RSSI) value, and transmitting the location information and the RSSI value;

a plurality of cognitive radio (CR) base stations disposed in the predetermined area and corresponding respectively the sets of the secondary users, each of the CR base stations receiving and collecting the location information and the RSSI values from a corresponding set of the secondary users; and a data fusion center communicating with each of the CR bas stations through a backbone network.

Each of the CR base stations transmits the location information and the RSSI values collected thereby to the data fusion center through the backbone network such that the data fusion center receives the location information and the RSSI values associated with all the secondary users.

The data fusion center is configured to obtain the number and locations of the primary transmitters in the predetermined area based on the location information and the RSSI values received thereby using a learning algorithm to thereby reconstruct a power propagation map of the primary transmitters.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
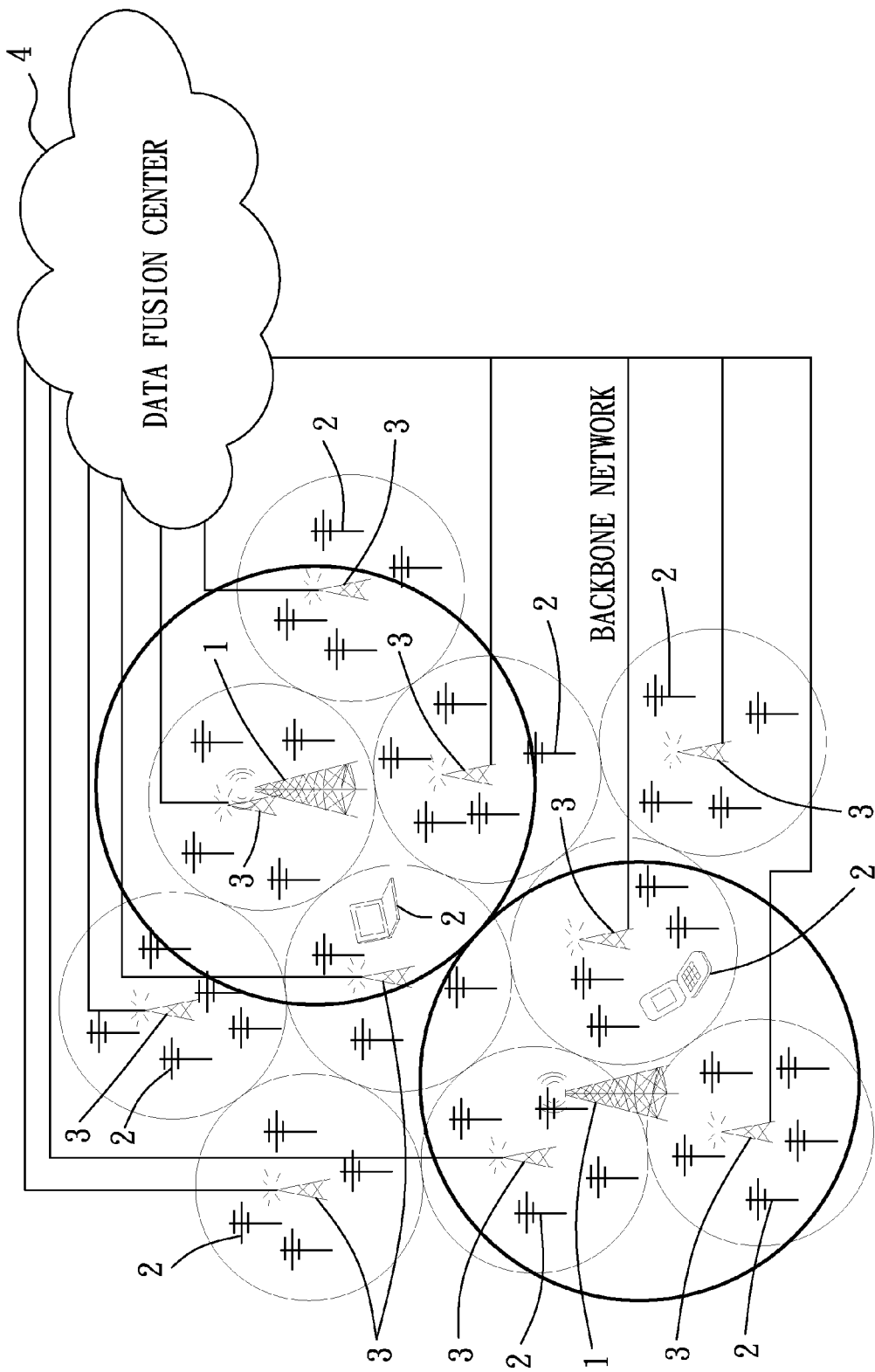
FIG. 1 is a schematic view showing the preferred embodiment of a cooperative spectrum sensing system for locationing primary transmitters according to the present invention.

Referring to FIG. 1, the preferred embodiment of a cooperative spectrum sensing system for locationing primary transmitters 1, for example, TV transmitters, in a predetermined area according to the present invention is shown to include a number (N) of secondary users 2, for example, notebook computers, cell phones, etc., in the predetermined area, a plurality of cognitive radio (CR) base stations 3 in the predetermined area, and a data fusion center 4. Each primary transmitter 1 transmits a power signal. In this embodiment, the predetermined area is an area of 60 Km×60 Km.

The secondary users 2 are divided into a plurality of sets. Each secondary user 2 includes a positioning module (not show), such as a GPS positioning module, for obtaining location information thereof, and is adapted for sensing the power signals from the primary transmitters 1 to generate a received signal strength indicator (RSSI) value. Each secondary user 2 transmits the location information and the RSSI value.

The CR base stations 3 correspond respectively to the sets of the secondary users 2. As such, each CR base stations 3 receives and collects the location information and the RSSI values from a corresponding set of the secondary users 2 through a control channel.

The data fusion center 4 communicates with each CR base station 3 through a backbone network.

Each CR base station 3 transmits the location information and the RSSI values collected thereby to the data fusion center 4 through the backbone network such that the data fusion center 4 receives the location information and the RSSI values associated with all the secondary users 2.

The data fusion center 4 is configured to obtain the number and locations of the primary transmitters 1 in the predetermined area based on the location information and the RSSI values received thereby using a learning algorithm to thereby reconstruct a power propagation map of the primary transmitters 1 that is regarded as an important basis for determining whether the vacant spectra can be utilized by the secondary users 2. In this embodiment, the data fusion center 4 is a cloud computing center. In addition, the learning algorithm is a sparse Bayesian learning algorithm.

Figure 2:
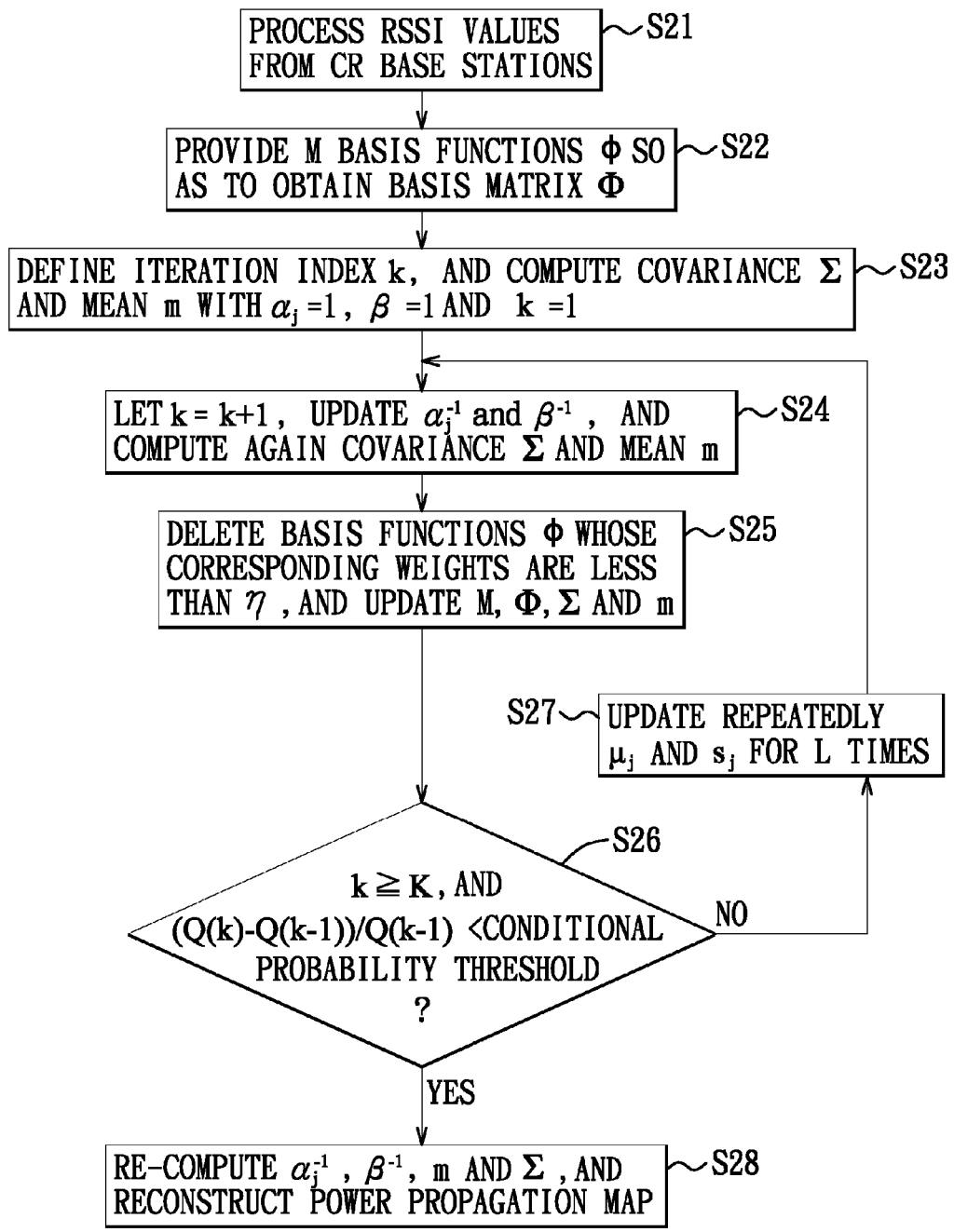
FIG. 2 is a flow chart illustrating how a data fusion center of the preferred embodiment obtains the number and locations of the primary transmitters and reconstructs the power propagation map of the primary transmitters.

FIG. 2 is a flow chart illustrating how the data fusion center 4 obtains the number and locations of the primary transmitters 1 in the predetermined area and reconstruct the power propagation map of the primary transmitters 1 in accordance with the sparse Bayesian learning algorithm.

In step S21, to alleviate large variation occurring in the RSSI values due to barriers, for example, high buildings or mountain terrain, the data fusion center 4 processes the RSSI values received thereby so that those of the RSSI values greater than a predetermined value ($P_{shift}$) are respectively updated with differences with the predetermined value ($P_{shift}$) and that those of the RSSI values not greater than the predetermined value ($P_{shift}$) are updated with zero. For example, the predetermined value ($P_{shift}$) is equal to about the receiving sensitivity of a TV receiver, such as −76 dBm. Thus, the processed RSSI values become not less than zero.

In step S22, initially, the data fusion center 4 provides a number (M) of basis functions ($\phi_1 \sim \phi_M$) that are randomly distributed in the predetermined area. The RSSI values processed in step S21 form a vector (t) that is represented by the following expression: $t=(t_1, t_2, \ldots, t_N)$, which is modeled by the following expression (1):

$$t = \Phi w + n \quad (1)$$

wherein $\Phi$ denotes a basis matrix consisting of the basis functions ($\phi_1 \sim \phi_M$ and is represented by the following expression (2):

$$\Phi_{N \times M} = \begin{bmatrix} \phi_1(x_1) & \phi_2(x_1) & \ldots & \phi_M(x_1) \\ \phi_1(x_2) & \ddots & & \vdots \\ \vdots & & \ddots & \vdots \\ \phi_1(x_N) & \ldots & \ldots & \phi_M(x_N) \end{bmatrix}, \quad (2)$$

where $x_i$ ($i=1, \ldots, N$) denotes the location of an $i^{th}$ one of the secondary users 2 and is represented as $x_i=(x_{i,x}, x_{i,y})$ and $X=(x_1, x_2, \ldots, x_N)^T$, w denotes a weighting coefficient vector and is represented by the following expression: $w=(w_1, w_2, \ldots, w_M)^T$, and n denotes a shadowing effect vector and is represented by the following expression: $n=(\epsilon_1, \epsilon_2, \ldots, \epsilon_N)^T$. In this model using Bayesian compressive sensing, the expression (1) also can be represented in a linear regression form by the following expression (3):

$$t_i = y(x_i, w) + \epsilon_i, i=1, \ldots, N \quad (3)$$

where $y(x_i, w)$ is the weighted sum of the M basis functions ($\phi_j(x_i)$) at the position of $x_i$, and can be represented by the following expression:

$$y(x_i, w) = \sum_{j=1}^{M} w_j \phi_j(x_i).$$

In addition, $w_j$ ($j=1, \ldots, M$) is initially given with a prior probability of $$N(0, \alpha_j^{-1}) = \frac{\sqrt{\alpha_j}}{\sqrt{2\pi}} \exp\left\{-\frac{\|w_i\|^2 \alpha_j}{2}\right\},$$

and $\epsilon_i$ ($i=1, \ldots, N$) is a zero-mean Gaussian random variable with variance) $\beta^{-1}$. Preferably, the weighting coefficient vector (w) that maximizes the likelihood function represented by the following expression (4) should be found.

$$p(t|X, w, \beta, M) = \sum_{j=1}^{M} N(t_i | y(x_i, w), \beta^{-1}) \quad (4)$$

Thus, the prior probability to the weighting coefficient vector (w) can be represented by the following expression (5):

$$p(w|\alpha, M) = \prod_{j=1}^{M} N(w_j | 0, \alpha_j^{-1}), \quad (5)$$

where hyperparameters $\alpha_j$ denotes the precision of the corresponding $w_j$ and $\alpha=(\alpha_1, \alpha_2, \ldots, \alpha_M)^T$. When $\alpha_j^{-1}$ is initialized with a very small value, which is equivalent to setting most coefficients in the weighting coefficient vector (w) to zero, the weighting coefficient vector (w) can be easily restrained to be sparse in advance. Consequently, an approximately $l_0$-norm sparse estimation of w can be obtained by iteratively computing a mean (m) and a covariance ($\Sigma$) of a posterior distribution of w represented by the following expression (6):

$$p(w|t,X,\alpha,\beta,M)=N(w|m,\Sigma), \quad (6)$$

as well as $\alpha_j$ and $\beta$ that maximize the log marginal likelihood function, i.e., ln p(t|X, w, $\alpha$, $\beta$, M).

In addition, $\phi_j(x_i)$ is substantially a two dimensional Laplacian function and is represented by the following expression (7):

$$\phi_j(x_i) \equiv \frac{1}{2s_j}\exp\left\{-\frac{D}{s_j}\right\}, \quad (7)$$

where D is defined as $\sqrt{(x_{i,x}-\mu_{j,x})^2+(x_{i,y}-\mu_{j,y})^2}$, $\mu_j$ is defined as the location of an $j^{th}$ one of the primary transmitters 1 and is represented $\mu_j \equiv (\mu_{j,x}, \mu_{j,y})$, and $s_j$ is a scale parameter and denotes a power decaying rate for the $j^{th}$ one of the primary transmitters 1. Thus, $\mu=(\mu_1,\mu_2,\ldots,\mu_M)$ and $s=(s_1,s_2,\ldots,s_M)$. As a result, the log marginal likelihood function becomes ln p(t|X, $\alpha$, $\mu$, s, $\beta$, M). The covariance ($\Sigma$) and the mean (m) are thus given respectively by $\Sigma=(\beta\Phi^T\Phi+A)^{-1}$, and m=$\beta\Sigma\Phi^T$t, where A=diag($\alpha_j$), which is an M×M diagonal matrix.

In step S23, an iteration index (k) is defined. The covariance ($\Sigma$) and the mean (m) are computed initially with $\alpha_j$=1, $\beta$=1 and k=0.

In step S24, the iteration index (k), $\alpha_j^{-1}$ and $\beta^{-1}$ are updated respectively with k+1, $$\frac{m_j^2}{\gamma_j} \text{ and } \frac{\|t-\Phi m\|^2}{N-\sum_{j=1}^{M}\gamma_j},$$

wherein $\gamma_j \equiv 1-\alpha_j\Sigma_{jj}$ and $\Sigma_{jj}$ is a diagonal term of the covariance ($\Sigma$). Then, the covariance ($\Sigma$) and the mean (m) are computed again with the updated iteration index (k), and $\alpha_j^{-1}$ and $\beta^{-1}$.

In step S25, the basis functions ($\phi_j(x_i)$) whose corresponding weighting coefficients ($w_j$) are less than a predetermined weight threshold ($\eta$), for example, $\eta$=2, are deleted. The number (M) of the basis functions ($\phi_j(x_i)$) are updated based on the remaining basis functions ($\phi_j(x_i)$) such that the basis matrix ($\Phi$) and A are updated, thereby updating the covariance ($\Sigma$) and the mean (m).

In step S26, it is defined that Q$\equiv$-ln p(t|X, w, $\beta$, $\mu$, s, M), and it is determined whether k is not less than a predetermined index threshold (K), for example, K=30, while (Q(k)-Q(k-1))/Q(k-1) is less than a conditional probability threshold. If the result is affirmative, the flow proceeds to step S28. Otherwise, the flow goes to step S27. In this embodiment, for example, the predetermined index threshold is 30, and the conditional probability threshold is 0.00001.

In step S27, $\mu_j$ and $s_j$ are updated repeatedly for L times, for example, L=3, based on the basis matrix ($\Phi$) and mean (m) updated in step S25 using $$\begin{bmatrix}\mu_{j,x}(k)\\ \mu_{j,y}(k)\\ s_j(k)\end{bmatrix} = \begin{bmatrix}\mu_{j,x}(k-1)\\ \mu_{j,y}(k-1)\\ s_j(k-1)\end{bmatrix} - \delta\begin{bmatrix}\frac{\partial Q}{\partial \mu_{j,x}}\Big|_{\mu_{j,x}(k-1)}\\ \frac{\partial Q}{\partial \mu_{j,y}}\Big|_{\mu_{j,y}(k-1)}\\ \frac{\partial Q}{\partial s_j}\Big|_{s_j(k-1)}\end{bmatrix}.$$

In this embodiment, $\delta$ is a learning rate greater than zero, for example, $\delta$=12. Thereafter, the flow goes back to step S24.

In step S28, $\alpha_j^{-1}$, $\beta^{-1}$, m and $\Sigma$ are re-computed. In this case, m serves as w, and the number (M) updated in step S25 serves as the number of the primary transmitters 1 in the predetermined area, and the power propagation map of the primary transmitters 1 is reconstructed based on $P_{shift}$, $\mu_j$, $s_j$, M and $w_j$.

Figure 3:
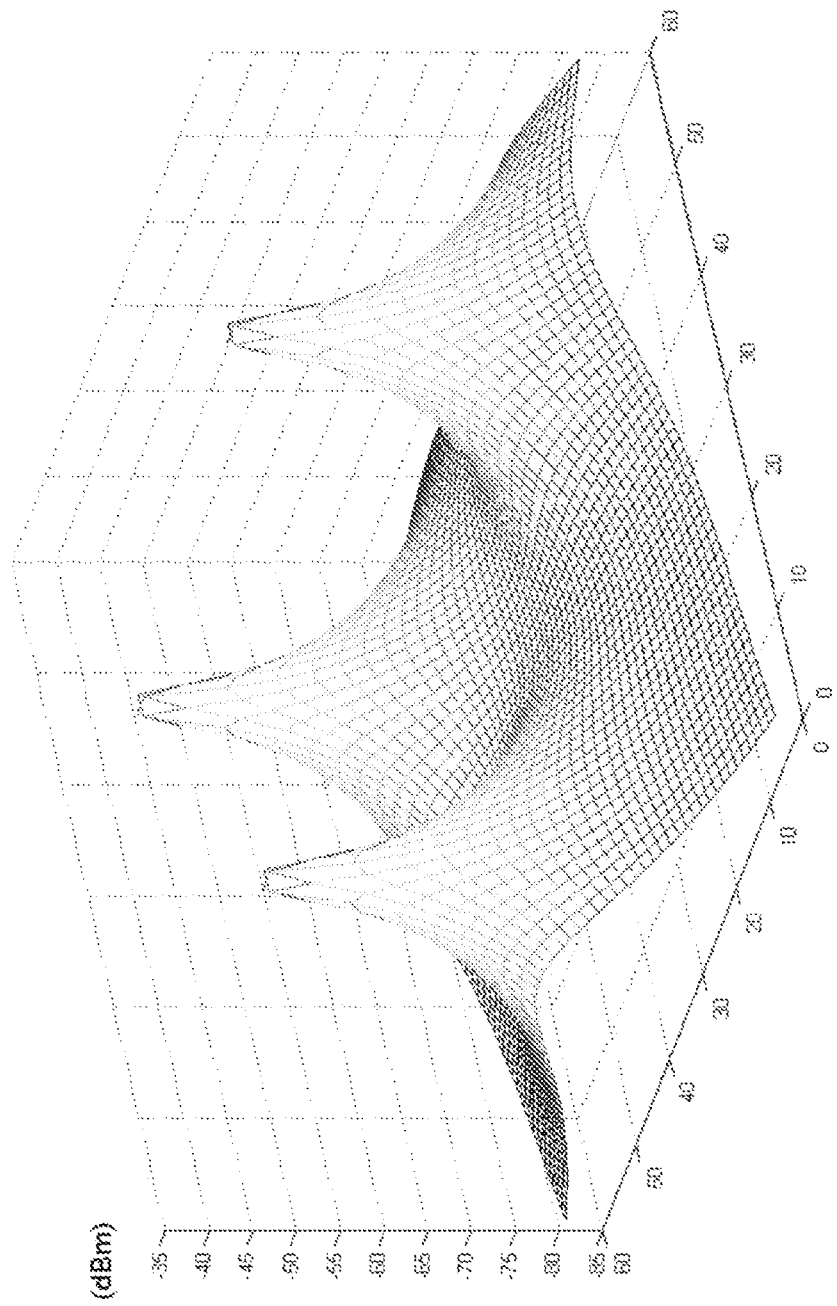
FIG. 3 is a three dimensional simulation plot showing an example of an original power propagation map for three primary transmitters constructed based on a conventional power path loss model.

FIG. 3 is a three dimensional simulation plot showing an example of an original power propagation map for three primary transmitters 1 constructed based on a conventional power path loss model, i.e., $$P_r(d) = P_t - \left(\overline{PL}(d_0) + 10n\log\left(\frac{d}{d_0}\right)\right) + W,$$

where n is the path loss exponent, $d_0$ is the close-in reference distance, d is the separation distance, $\overline{PL}(d_0)$ is the reference path loss, and W is a zero-mean Gaussian random variable. In this example, the predetermined area is an area of 60 Km×60 Km. The transmitting power ($P_t$) of each primary transmitter 1 is 50 dBm, $d_0$=1 Km, $\overline{PL}(d_0)$=88.9113 dB, n=3, and W=2.

Figure 4:
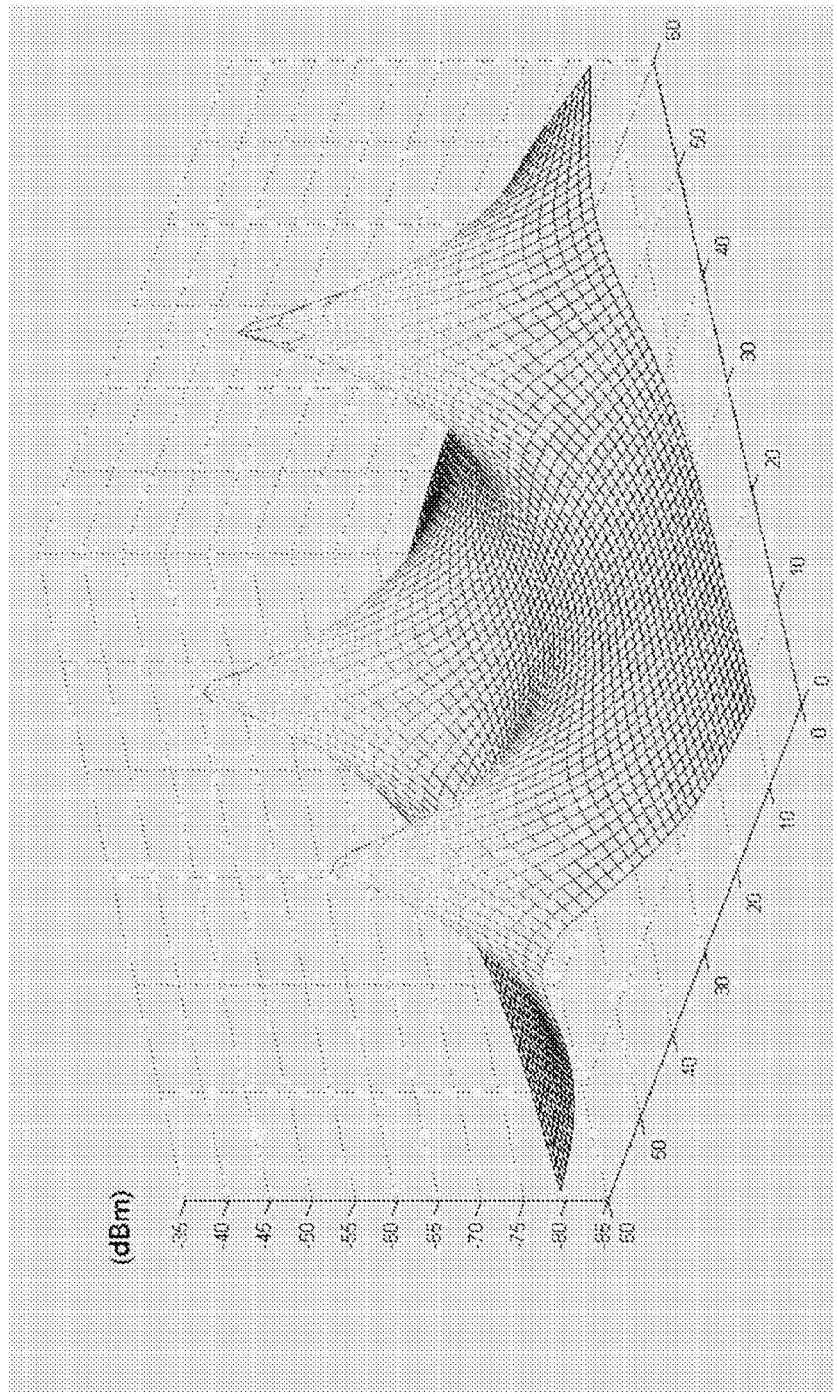
FIG. 4 is a three dimensional simulation plot showing a power propagation map reconstructed by the preferred embodiment under the same conditions as those of the example of FIG. 3.

FIG. 4 is a three dimensional simulation plot showing a power propagation map reconstructed by the preferred embodiment under the same conditions as the above example. In this simulation, N$\cong$3K, the measurement rate is 0.075, L=3, and $\eta$=20. From the reconstructed power propagation map of FIG. 4, the number of the primary transmitters 1, $\mu$, and s are obtained, and match those in original power propagation map of FIG. 3.

Figure 5:
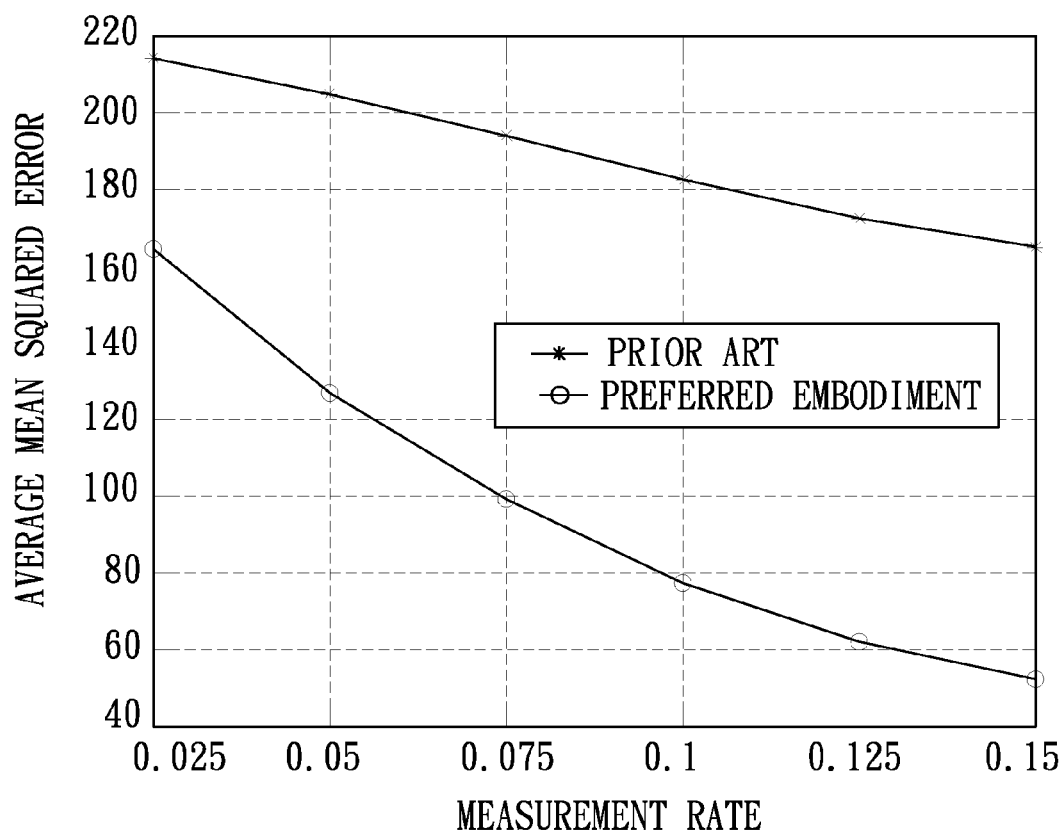
FIG. 5 is a plot illustrating the relationships between the average mean squared error and measurement rate for the prior art and the preferred embodiment.

FIG. 5 is a plot illustrating the relationships between the average mean squared error and measurement rate for the prior art, i.e., the conventional $l_1$-norm method, and the preferred embodiment. It is apparent that the sparse Bayesian learning algorithm of the preferred embodiment has a superior reconstructed capability compared to the conventional $l_1$-norm method even though the number of measurements is below the theoretical lower bound for the conventional $l_1$-norm method.

In sum, the cooperative spectrum sensing system of the present invention can accurately estimate the number and locations of the primary transmitters 1. In addition, the computation complexity is reduced through deletion of the basis functions performed in the parse Bayesian learning algorithm.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A cooperative spectrum sensing method of locationing primary transmitters in a cognitive radio (CR) system, each of the primary transmitters transmitting a power signal, the CR system including a number (N) of secondary users, which are randomly located in a predetermined area and are divided into a plurality of sets, and a plurality of CR base stations disposed in the predetermined area and corresponding respectively the sets of the secondary users, said method comprising the steps of:

a) configuring each of the secondary users to obtain location information thereof, generate a received signal strength indicator (RSSI) value in response to sensing the power signals from the primary transmitters, and transmit the location information and the RSSI value such that each of the CR base stations receives and collects the location information and the RSSI values from a corresponding set of the secondary users;
b) configuring each of the CR base stations to transmit the location information and the RSSI values collected thereby to a data fusion center through a backbone network such that the data fusion center receives the location information and the RSSI values associated with all the secondary users; and
c) configuring the data fusion center to obtain the number and locations of the primary transmitters in the predetermined area based on the location information and the RSSI values received thereby using a learning algorithm to thereby reconstruct a power propagation map of the primary transmitters in the predetermined area.

2. The cooperative spectrum sensing method as claimed in claim 1, wherein the data fusion center is a cloud computing center.

3. The cooperative spectrum sensing method as claimed in claim 1, wherein the RSSI values generated respectively by the secondary users are processed to form a vector (t), which is modeled $$t = \Phi w + n,$$

wherein $\Phi$ denotes a basis matrix and is represented as $$\Phi_{N \times M} = \begin{bmatrix} \phi_1(x_1) & \phi_2(x_1) & \ldots & \phi_M(x_1) \\ \phi_1(x_2) & \ddots & & \vdots \\ \vdots & & \ddots & \vdots \\ \phi_1(x_N) & \ldots & \ldots & \phi_M(x_N) \end{bmatrix},$$

where $\phi_1 \sim \phi_M$ denote M basis functions uniformly distributed in the predetermined area, $x_i$ (i=1, ..., N) denotes the location of an $i^{th}$ one of the secondary users and is represented as $x_i = (x_{i,x}, x_{i,y})$, w denotes a weighting coefficient vector and is represented as $w = (w_1, w_2, \ldots, w_M)^T$, and n denotes a shadowing effect vector and is represented as $n = (\epsilon_1, \epsilon_2, \ldots, \epsilon_N)^T$.

4. The cooperative spectrum sensing method as claimed in claim 3, wherein $w_j$ (j=1, ..., M) is initially given with a prior probability of $$N(0, \alpha_j^{-1}) = \frac{\sqrt{\alpha_j}}{\sqrt{2\pi}} \exp\left\{-\frac{\|w_i\|^2 \alpha_j}{2}\right\},$$

and $\epsilon_i$ (i=1, ..., N) is a zero-mean Gaussian random variable with) variance $\beta^{-1}$.

5. The cooperative spectrum sensing method as claimed in claim 4, wherein $\phi_j(x_i)$ is substantially a two dimensional Laplacian function and is represented as $$\phi_j(x_i) \equiv \frac{1}{2s_j} \exp\left\{-\frac{D}{s_j}\right\},$$

where D is defined as $\sqrt{(x_{i,x}-\mu_{j,x})^2 + (x_{i,y}-\mu_{j,y})^2}$, $\mu_j$ is defined as the location of an $j^{th}$ one of the primary transmitters and is represented $\mu_j = (\mu_{j,x}, \mu_{j,y})$, and $s_j$ is a scale parameter and denotes a power decaying rate for the $j^{th}$ one of the primary transmitters.

6. The cooperative spectrum sensing method as claimed in claim 5, wherein:
the learning algorithm is a sparse Bayesian learning algorithm; and step c) further includes the sub-steps of:
c-1) configuring the data fusion center to process each of the RSSI values received thereby so that those of the RSSI values greater than a predetermined value ($P_{shift}$) are respectively updated with differences with the predetermined value ($P_{shift}$) and that those of the RSSI values not greater than the predetermined value ($P_{shift}$) are updated with zero;
c-2) configuring the data fusion center to initially provide the number (M) of the basis functions ($\phi_1 \sim \phi_M$) uniformly distributed in the predetermined area so as to obtain the basis matrix $\Phi$ associated with the locations of the secondary users;
c-3) configuring the data fusion center to define an iteration index (k) and compute a covariance ($\Sigma$) and a mean (m) initially with $\alpha_j = 1$, $\beta = 1$ and k=0, wherein $\Sigma = (\beta \Phi^T \Phi + A)^{-1}$, $m = \beta \Sigma \Phi^T t$ and $A = \text{diag}(\alpha_j)$, which is an M×M diagonal matrix;
c-4) configuring the data fusion center to update respectively the iteration index (k), $\alpha_j^{-1}$ and $\beta^{-1}$ with k+1, $$\frac{m_j^2}{\gamma_j} \text{ and } \frac{\|t - \Phi m\|^2}{N - \sum_{j=1}^{M} \gamma_j},$$

wherein $\gamma_j \equiv 1 - \alpha_j \Sigma_{jj}$ and $\Sigma_{jj}$ is a diagonal term of the covariance ($\Sigma$), and compute again the covariance ($\Sigma$) and the mean (m) with the updated iteration index (k), $\alpha_j^{-1}$ and $\beta^{-1}$;
c-5) configuring the data fusion center to delete the basis functions ($\phi_j(x_i)$) whose corresponding weighting coefficients ($w_j$) are less than a predetermined weight threshold ($\eta$), and update the number (M) of the basis functions ($\phi_j(x_i)$) based on the remaining basis functions ($\phi_j(x_i)$) such that the basis matrix ($\Phi$) and A are updated, thereby updating the covariance ($\Sigma$) and the mean (m);
c-6) configuring the data fusion center to compute Q(k), wherein $Q \equiv -\ln p(t|X, w, \beta, \mu, s, M)$, and update repeatedly $\mu_j$ and $s_j$ for predetermined times based on the basis matrix ($\Phi$) and mean (m) updated in step c-5) using $$\begin{bmatrix} \mu_{j,x}(k) \\ \mu_{j,y}(k) \\ s_j(k) \end{bmatrix} = \begin{bmatrix} \mu_{j,x}(k-1) \\ \mu_{j,y}(k-1) \\ s_j(k-1) \end{bmatrix} - \delta \begin{bmatrix} \frac{\partial Q}{\partial \mu_{j,x}} \Big|_{\mu_{j,x}(k-1)} \\ \frac{\partial Q}{\partial \mu_{j,y}} \Big|_{\mu_{j,y}(k-1)} \\ \frac{\partial Q}{\partial s_j} \Big|_{s_j(k-1)} \end{bmatrix},$$

upon detecting that k is less than a predetermined index threshold or that (Q(k)−Q(k−1))/Q(k−1) is not less than a conditional probability threshold, wherein and $\delta$ is a learning rate greater than zero;
c-7) repeating steps c-4) to c-6) until k is not less than the predetermined index threshold while (Q(k)−Q(k−1))/Q(k−1) is less than the conditional probability threshold; and
c-8) configuring the data fusion center to re-compute $\alpha_j^{-1}$, $\beta^{-1}$, m and $\Sigma$, wherein m serves as w and the number (M) updated in step c-5) serves as the number of the primary transmitters in the predetermined area, and reconstruct the power propagation map of the primary transmitters based on $P_{shift}$, $\mu_j$, $s_j$, M and $w_j$.

7. A cooperative spectrum sensing system for locationing primary transmitters in a predetermined area, each of primary transmitters transmitting a power signal, said cooperative spectrum sensing system comprising:
- a number (N) of secondary users randomly located in the predetermined area and divided into a plurality of sets, each of said secondary users including a positioning module for obtaining location information thereof, being adapted for sensing the power signals from the primary transmitters to generate a received signal strength indicator (RSSI) value, and transmitting the location information and the RSSI value;
- a plurality of cognitive radio (CR) base stations disposed in the predetermined area and corresponding respectively the sets of the secondary users, each of said CR base stations receiving and collecting the location information and the RSSI values from a corresponding set of said secondary users; and
- a data fusion center communicating with each of said CR bas stations through a backbone network;
- wherein each of the CR base stations transmits the location information and the RSSI values collected thereby to said data fusion center through the backbone network such that the data fusion center receives the location information and the RSSI values associated with all the secondary users; and
- wherein said data fusion center is configured to obtain the number and locations of the primary transmitters in the predetermined area based on the location information and the RSSI values received thereby using a learning algorithm to thereby reconstruct a power propagation map of the primary transmitters.

8. The cooperative spectrum sensing system as claimed in claim 7, wherein said data fusion center is a cloud computing center.

9. The cooperative spectrum sensing system as claimed in claim 7, wherein the RSSI values generated respectively by said secondary users are processed to form a vector (t), which is modeled using linear regression as $$t = \Phi w + n,$$

wherein $\Phi$ denotes a basis matrix and is represented as $$\Phi_{N \times M} = \begin{bmatrix} \phi_1(x_1) & \phi_2(x_1) & \dots & \phi_M(x_1) \\ \phi_1(x_2) & \ddots & & \vdots \\ \vdots & & \ddots & \vdots \\ \phi_1(x_N) & \dots & \dots & \phi_M(x_N) \end{bmatrix},$$

where $\phi_1 \sim \phi_M$ denote M basis functions uniformly distributed in the predetermined area, $x_i$ ($i=1, \dots, N$) denotes the location of an $i^{th}$ one of the secondary users and is represented as $x_i = (x_{i,x}, x_{i,y})$, w denotes a weighting coefficient vector and is represented as $w = (w_1, w_2, \dots, w_M)^T$, and n denotes a shadowing effect vector and is represented as $n = (\epsilon_1, \epsilon_2, \dots, \epsilon_N)^T$.

10. The cooperative spectrum sensing system as claimed in claim 9, wherein $w_j$ ($j=1, \dots, M$) is initially given with a prior probability of $$N(0, \alpha_j^{-1}) = \frac{\sqrt{\alpha_j}}{\sqrt{2\pi}} \exp\left\{-\frac{\|w_j\|^2 \alpha_j}{2}\right\},$$

and $\epsilon_i$ ($i=1, \dots, N$) is a zero-mean Gaussian random variable with) variance $\beta^{-1}$.

11. The cooperative spectrum sensing system as claimed in claim 10, wherein $\phi_j(x_i)$ is substantially a two dimensional Laplacian function and is represented as $$\phi_j(x_i) \equiv \frac{1}{2s_j} \exp\left\{-\frac{D}{s_j}\right\},$$

where D is defined as $\sqrt{(x_{i,x} - \mu_{j,x})^2 + (x_{i,y} - \mu_{j,y})^2}$, $\mu_j$ is defined as the location of an $j^{th}$ one of the primary transmitters and is represented $\mu_j \equiv (\mu_{j,x}, \mu_{j,y})$, and $s_j$ is a scale parameter and denotes a power decaying rate for the $j^{th}$ one of the primary transmitters.

12. The cooperative spectrum sensing system as claimed in claim 11, wherein the learning algorithm is a sparse Bayesian learning algorithm such that said data fusion center is configured in accordance with the sparse Bayesian learning algorithm to perform
- a first operation, where each of the RSSI values received by said data fusion center is processed so that those of the RSSI values greater than a predetermined value ($P_{shift}$) are respectively updated with differences with the predetermined value ($P_{shift}$) and that those of the RSSI values not greater than the predetermined value ($P_{shift}$) are updated with zero,
- a second operation, where the number (M) of the basis functions ($\phi_1 \sim \phi_M$) are initially provided and are uniformly distributed in the predetermined area so as to obtain the basis matrix ($\Phi$) associated with the locations of said secondary users,
- a third operation, where an iteration index (k) is defined, and where a covariance ($\Sigma$) and a mean (m) are computed initially with $\alpha_j=1$, $\beta=1$ and k=0, wherein $\Sigma = (\beta \Phi^T \Phi + A)^{-1}$, $m = \beta \Sigma \Phi^T t$ and $A = \text{diag}(\alpha_j)$, which is an M×M diagonal matrix,
- a fourth operation, where the iteration index (k), $\alpha^{-1}$ and $\beta^{-1}$ are updated respectively with k+1, $$\frac{m_j^2}{\gamma_j} \text{ and } \frac{\|t - \Phi m\|^2}{N - \sum_{j=1}^{M} \gamma_j},$$

wherein $\gamma_j \equiv 1 - \alpha_j \Sigma_{jj}$ and $\Sigma_{jj}$ is a diagonal term of the covariance ($\Sigma$), such that the covariance ($\Sigma$) and the mean (m) are computed again with the updated iteration index (k), $\alpha_j^{-1}$ and $\beta^{-1}$,
- where the basis functions ($\phi_j(x_i)$) whose corresponding weighting coefficients ($w_i$) are less than a predetermined weight threshold ($\eta$) are deleted to thereby update the number (M) of the basis functions ($\phi_j(x_i)$) based the remaining basis functions ($\phi_j(x_i)$) such that the basis matrix ($\Phi$) and A are updated, thereby updating the covariance ($\Sigma$) and the mean (m), and
- where Q(k) is computed, wherein $Q \equiv -\ln p(t|X, w, \beta, \mu, s, M)$, and $\mu_j$ and $s_j$ are updated repeatedly for predetermined times based on the updated basis matrix ($\Phi$) and mean (m) using $$\begin{bmatrix} \mu_{j,x}(k) \\ \mu_{j,y}(k) \\ s_j(k) \end{bmatrix} = \begin{bmatrix} \mu_{j,x}(k-1) \\ \mu_{j,y}(k-1) \\ s_j(k-1) \end{bmatrix} - \delta \begin{bmatrix} \frac{\partial Q}{\partial \mu_{j,x}}\big|_{\mu_{j,x}(k-1)} \\ \frac{\partial Q}{\partial \mu_{j,y}}\big|_{\mu_{j,y}(k-1)} \\ \frac{\partial Q}{\partial s_j}\big|_{s_j(k-1)} \end{bmatrix},$$

upon detecting that k is less than a predetermined index threshold or that $(Q(k) - Q(k-1))/Q(k-1)$ is not less than a conditional probability threshold, wherein and $\delta$ is a learning rate greater than zero, a fifth operation, where the fourth operation is performed repeatedly until k is not less than the predetermined index threshold while $(Q(k)-Q(k-2))/Q(k-1)$ is less than the conditional probability threshold, and a sixth operation, where $\alpha^{-1}$, $\beta^{-1}$, m and $\Sigma$ are re-computed, wherein m serves as w and the number (M) updated in the fourth operation serves as the number of the primary transmitters in the predetermined area, such that the power propagation map is reconstructed based on $P_{shift}$, $\mu_j$, $s_j$, M and $w_j$.

* * * * *